June 26, 1962  H. H. HOLMAN  3,040,897
INVERTABLE CONTAINER
Filed March 9, 1956  2 Sheets-Sheet 1

INVENTOR.
HERBERT H. HOLMAN
BY *James and Franklin*
ATTORNEYS

June 26, 1962 H. H. HOLMAN 3,040,897
INVERTABLE CONTAINER
Filed March 9, 1956 2 Sheets-Sheet 2

INVENTOR.
HERBERT H. HOLMAN
BY James and Franklin
ATTORNEYS

United States Patent Office 3,040,897
Patented June 26, 1962

3,040,897
INVERTABLE CONTAINER
Herbert H. Holman, 1161 Werth Ave., Menlo Park, Calif.
Filed Mar. 9, 1956, Ser. No. 570,569
4 Claims. (Cl. 210—244)

This invention relates to containers, and more particularly to containers for solid units immersed in liquid.

The primary object of the present invention is to provide a storage device or container in which solid units may be stored immersed in liquid, and yet made available in drained condition. A more particular object is to provide such a container for storing edible food units in liquid, typically fruit in juice, yet for serving the same conveniently drained of the juice.

The invention is particularly intended for use with cocktail fruit. Martinis and Manhattans are popular cocktails and are usually served with olives or onions in one case, and cherries in the other. These ordinarily come packed in long narrow-mouthed bottles, so that it is quite a chore to get them out without getting one's hands wet and sticky. A further object of the present invention is to provide a single jar for storing cocktail fruit in its juice or liquid, and for serving the same strained of liquid. The term "fruit" is used for convenience, but is intended to include onions or other edible unit which might technically be deemed a vegetable rather than a fruit.

To accomplish the foregoing objects, and other more specific objects which will hereinafter appear, my invention resides in the storage and serving container, and the elements thereof, and their relation one to another, as are more particularly described in the following specification. The specification is accompanied by drawings, in which.

Figure 1:
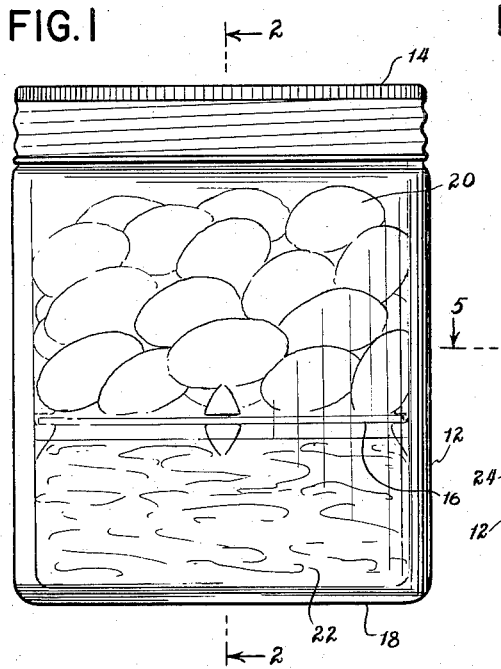
FIG. 1 is a front elevation of a container embodying features of my invention.
Figure 2:
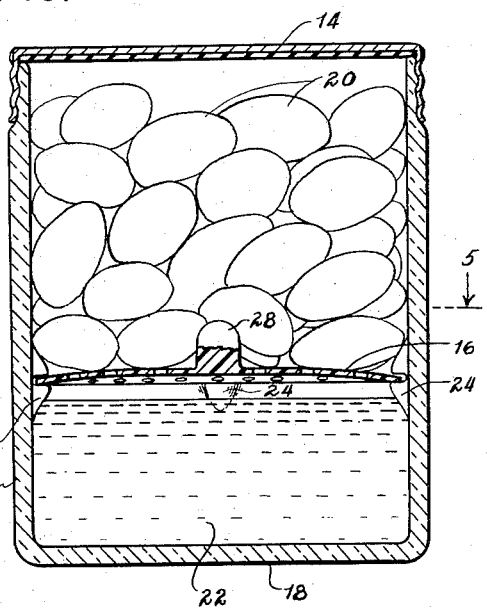
FIG. 2 is a vertical section therethrough, taken approximately in the plane of the line 2—2 of FIG. 1.
Figure 4:
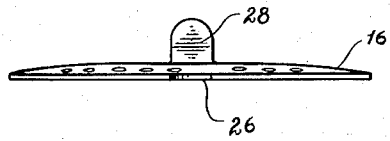
FIG. 4 is an edge view of the strainer or partition.

Referring to the drawing, and more particularly to FIGS. 1 and 2, the device there shown comprises a container 12 having a releasable cap 14 for closing the same with a leak-proof fit. There is also a strainer or perforated partition 16 which is secured across the container 12 between the cap 14 and the bottom 18. It will be evident that this partition 16 supports the solid units 20 thereabove, while the liquid 22 is below the partition, as shown. Thus the units 20 are drained of liquid, and when the cap 14 is opened one or more units 20 are readily removed as needed. In a typical case the units 20 are olives, onions or cherries for cocktails, and the liquid is appropriate for the particular food.

Figure 3:
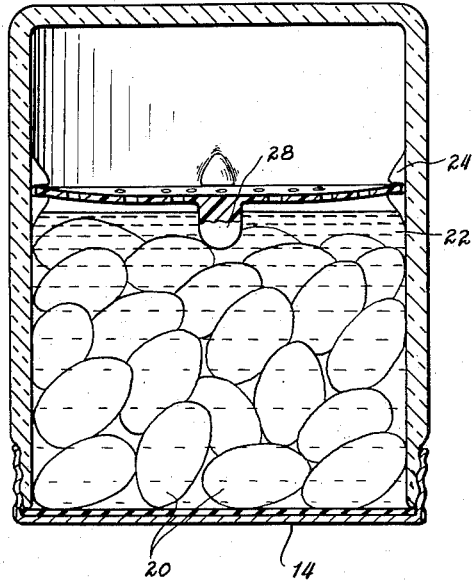
FIG. 3 is a section similar to FIG. 2 but showing the device in its inverted or storage position.
Figure 5:
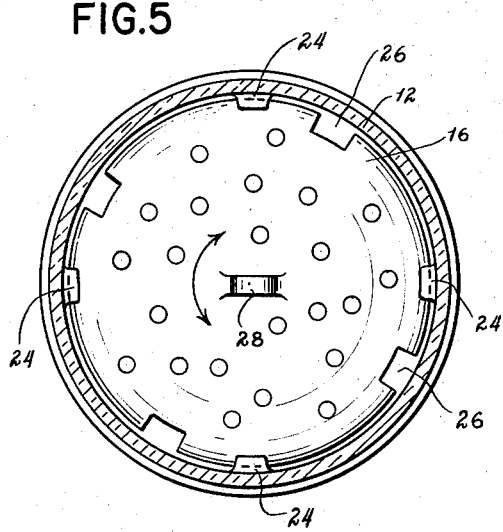
FIG. 5 is a horizontal section taken approximately in the plane of the line 5—5 of FIG. 2.

When the fruit is being stored the container is simply inverted as shown in FIG. 3, thus placing the fruit 20 at the bottom, fully immersed in the liquid 22.

The location of the partition 16 between the top and bottom of the container is important because, on the one hand, it would waste container space and liquid to have the partition too high, and, on the other hand, the fruit would not be covered with liquid when inverted if the liquid compartment is too small. The ratio of liquid space to fruit space varies with the size and shape of the fruit, and to some extent even with the diameter of the jar, for in small diameters the jar diameter affects the nesting of the fruit. A manufacturer packaging olives, for example, may readily determine by experiment the ratio for any particular size olive, it being necessary merely to fill a conventional jar or container of approximately the right diameter, first with olives, and then with liquid around the olives, and to thereafter pour off the liquid into a similar container, or which at least has the same diameter. The relative height of the liquid, to the height of the container filled with fruit, establishes the height ratio of the two compartments. I have found that the ratio does not change with fruit diameter as markedly as might be expected. For example, using ½" spheres in a jar three inches in diameter, the partition may be placed one-third up from the bottom. On changing to spheres ⅝" in diameter in a jar having the same 3" diameter, the ratio may change from 33% to, say, 30%, that is, the partition may be three-tenths of the height of the jar from the bottom of the jar. Of course, the true fruit is not perfectly spherical, and is not perfectly uniform in size, but it will be apparent that over some considerable range of variation it will suffice to have the partition one-third of the way from the bottom.

Considering the particular form of the invention shown in FIGS. 1–5 in greater detail, the container 12 is a wide-mouthed glass jar having a plurality of support means 24 molded integrally on its inside wall. In the present case there are four such support means, shown in FIG. 5, but three or more may be used. The partition or strainer 16 is generally circular and dimensioned to fit through the open top of the jar. It has four notches 26 dimensioned and located to clear the support means 24. The latter include upper and lower parts with a slot therebetween big enough to receive the edge of the strainer. The latter includes a handle portion 28, and it will be evident that the strainer may be inserted and then turned to bring the notches 26 out of alignment with the supports 24, thus anchoring the sieve in position, as shown in FIGS. 2 and 3. If desired the lower parts of supports 24 may be made wider in peripheral direction than the notches, to stop the strainer from moving beyond the lower parts after passing the uper parts. The strainer may be made of glass or a suitable plastic which is immune to attack by the liquid, or it may be made of a suitable metal or plated metal. Holes are not essential if there is clearance around the edge. Also the notches 26 act as holes.

Figure 6:
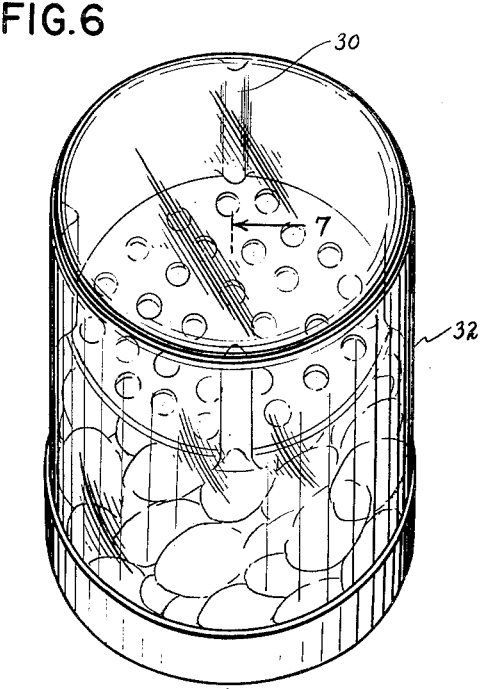
FIG. 6 is a perspective view of a modification.
Figure 7:
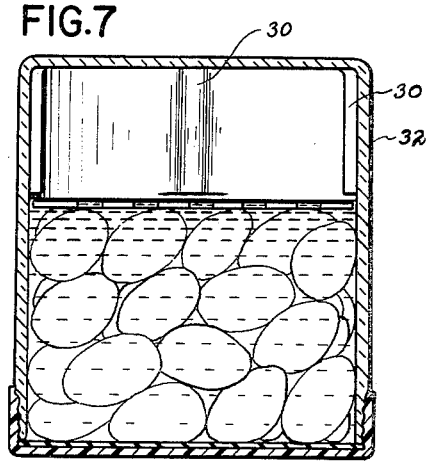
FIG. 7 is a vertical section taken approximately in the plane of the line 7—7 of FIG. 6.
Figure 8:
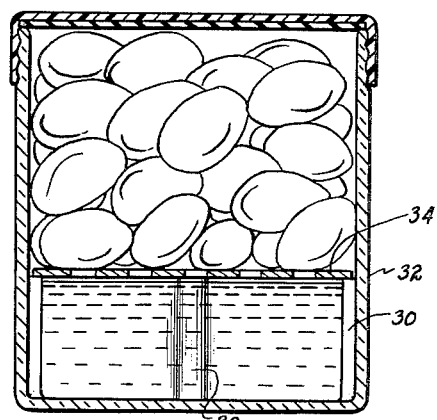
FIG. 8 is a similar section showing the device in upright position.

Referring now to FIGS. 6, 7 and 8 of the drawing, I there show a modification of the invention in which the supports 30 of jar 32 take the form of ribs extending vertically from the bottom to the desired height, say one-third the height of the container. This facilitates molding of the ribs on the inside of the container. The strainer or sieve 34 may be made of sheet metal, or metal wire mesh, or a sheet of plastic, or a disc of glass or other ceramic material. In this arrangement there is nothing to support the strainer when the jar is inverted, but ordinarily it is supported by the fruit in the jar, and no difficulty arises.

Figure 10:
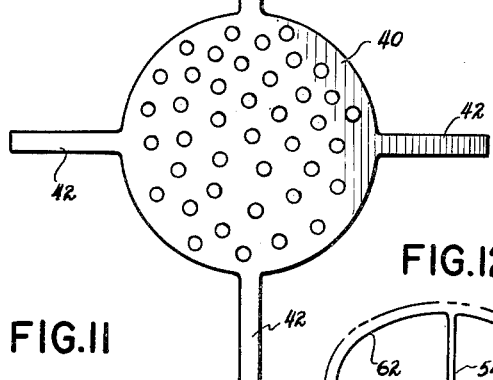
FIG. 10 shows the strainer or partition of a modified device prior to bending the support legs thereof.
Figure 9:
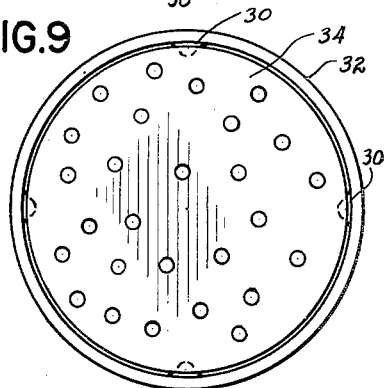
FIG. 9 is a plan view with the cap removed.
Figure 11:
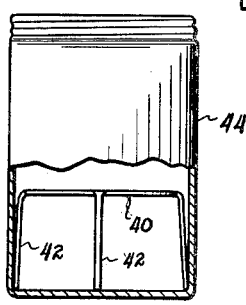
FIG. 11 is a partially sectioned elevation of a modification using the strainer partition of FIG. 10.

Another form of the invention is shown in FIGS. 10 and 11 of the drawing. In this case the strainer 40 has support legs 42. They may be formed integrally with the part 40, as by stamping the entire piece out of any suitable sheet material. The legs 42 are then bent inward to a position substantially at right angles to the strainer, as shown in FIG. 11. The legs 42 have a length designed, as previously explained, to establish the proper volumetric ratio between the upper and lower compartments. In a typical case the legs 42 have a height one-third the height of the jar 44. The strainer portion 40 is small enough to fit through the neck of the jar, which is preferably wide open at the top. The legs 42 preferably spring outward and exert spring pressure on the inside of the jar. Thus the partition 40 remains in position when the jar is inverted. If the legs 42 are bent inward too far and exert no resilient pressure, they nevertheless act as guides which prevent tilting of the partition 40 in the event that it slides downward when the jar is inverted.

Figure 12:
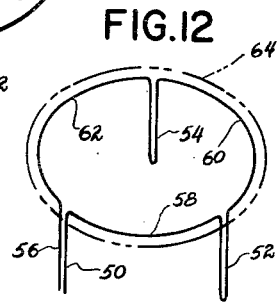
FIG. 12 is a perspective view of a modification using bent wire support for a strainer.

Still another form of the invention is illustrated in FIG. 12 in which a single piece of wire is bent to form a starting leg 50, additional reversely bent legs 52 and 54, and a finishing leg 56, all connected by arcuate pieces 58, 60 and 62. A strainer or sieve, shown schematically by the broken line outline 64, rests on the rings 58, 60 and 62, and is preferably secured thereto, as by means of a touch of solder or preferably by spot welding. In this case the partition may be a circular piece of screen or sieve composed of ordinary wire mesh material made of a suitable metal or plated with a suitable metal to resist attack by the product being packaged.

The legs 50, 52, 54 and 56 may be bent outward somewhat, as was mentioned in the case of the legs 42, so that they bear frictionally and resiliently against the sides of the jar, and thus inhibit movement of the sieve downward when the jar is inverted. However, this is not essential, and even if the legs fit the jar freely they will nevertheless prevent tilting of the sieve should it move axially.

It is believed that the construction and method of use of my improved invertable container, as well as the many advantages thereof, will be apparent from the foregoing detailed description. For storage the container is inverted, whereupon the fluid gravitates into the larger compartment containing the solid units, and immerses or covers them. When the contents are to be used the container is simply stood rightside up, and the cover removed. The fluid gravitates to the lower compartment where it is out of contact with the solid units. Thus there is easy accessability to the solid units, with the latter in a drained condition. Sanitary handling of the units is facilitated and time is saved. There is no danger of spilling of liquid while removing the solid units.

It will be apparent that while I have shown and described my invention in several preferred forms, changes may be made in the structures shown, without departing from the scope of the invention, as sought to be defined in the following claims. In the claims the term "strainer" is intended to include any partition which passes the liquid but not the solid units.

I claim:

1. A device for storing solid units in liquid and serving said units strained of liquid, said device comprising a wide mouth container having a bottom suitable for use as a base, a releasable and reusable cap for repeatedly closing the same with a leak-proof fit, said cap being suitable for use as a base when inverted, and a strainer plate disposed across said container between the top and bottom to support the units thereabove with the liquid there-below when the container is upright, the inside wall of said container having molded thereon a plurality of support means between the strainer and the bottom for supporting said strainer against movement toward the bottom, said strainer being located by said support means at such distance from the bottom as to accommodate beneath it sufficient liquid to fill the interstices between a full load of the units initially needed to substantially fill the space above the strainer, whereby the initial full load of units may be stored with the units all immersed in liquid with the container inverted, but served with the units all drained of liquid with the container upright.

2. A device for storing cocktail fruit in liquid and serving said fruit strained of liquid, said device comprising a wide mouth jar having a bottom suitable for use as a base, a releasable and reusable cap for repeatedly closing the same with a leak-proof fit, said cap being suitable for use as a base when inverted, a strainer plate disposed across said jar between the top and bottom to support the fruit thereabove with the liquid therebelow when the jar is upright, the inside wall of said jar having molded thereon a plurality of support means between said strainer and the bottom for supporting said strainer against movement toward the bottom, said strainer being located by said support means volumetrically about one-third of the height of the jar from the bottom, whereby the fruit may be stored with the fruit all drained of liquid with the jar inverted, but served with the fruit all immersed in liquid with the jar upright.

3. In combination, a quantity of discrete solid units, a quantity of liquid, and a device for storing the solid units with the units all immersed in the liquid and for serving said units with the units all strained of the liquid, said device comprising a wide mouth container having a bottom suitable for use as a base, a releasable and reusable cap for repeatedly closing the same with a leakproof fit, said cap being suitable for use as a base when inverted, and a strainer plate disposed across said container between the top and bottom and supporting the units thereabove with the liquid therebelow when the container is upright, the inside wall of said container having molded thereon a plurality of support means between the strainer and the bottom for supporting said strainer against movement toward the bottom, said strainer being located by said support means at such distance from the bottom as to accommodate all of said liquid beneath it, said liquid being sufficient to fill the interstices between a full load of the units, whereby the initial full load of units may be stored immersed in liquid with the container inverted, but served with the units all drained of liquid with the container upright.

4. In combination, a quantity of cocktail fruit, a quantity of liquid, and a device for storing the cocktail fruit with the fruit all immersed in the liquid for serving said fruit with the fruit all strained of the liquid, said device comprising a wide mouth jar having a bottom suitable for use as a base, a releasable and reusable cap for repeatedly closing the same with a leak-proof fit, said cap being suitable for use as a base when inverted, said jar having about three times the capacity needed for said liquid, a strainer plate disposed across said jar between the top and bottom and supporting the fruit thereabove with the liquid therebelow when the jar is upright, the inside wall of said jar having molded thereon a plurality of support means between the strainer and the bottom for supporting said strainer against movement toward the bottom, said strainer being located by said support means volumetrically about one-third of the height of the jar from the bottom, whereby the fruit may be stored with the fruit all immersed in liquid with the jar inverted, but served with the fruit all drained of liquid with the jar upright.

References Cited in the file of this patent

UNITED STATES PATENTS

| | | |
|---|---|---|
| 248,866 | Littlejohn | Nov. 1, 1881 |
| 359,449 | King | Mar. 15, 1887 |
| 1,948,353 | Lagorio | Feb. 20, 1934 |